United States Patent Office 2,993,860
Patented July 25, 1961

2,993,860
POLYMERIZED ESTER CONTAINING LUBRICANT COMPOSITIONS AND PROCESS FOR PREPARING SAME
Stuart Walter Critchley, Sale, England, assignor to The Geigy Company Limited, Manchester, England
No Drawing. Filed Jan. 28, 1958, Ser. No. 711,568
Claims priority, application Great Britain Feb. 8, 1957
15 Claims. (Cl. 252—57)

This invention relates to improvements in dicarboxylic acid esters and in lubricant compositions.

It is known to use, as lubricants, liquid diesters of dicarboxylic acids, especially diesters formed from straight-chain or branched-chain saturated monohydric aliphatic alcohols. It is also known to mix such diesters with other compounds to increase their viscosity.

One of the objects of the present invention is to produce a "thickened" diester lubricant, especially one which has been "thickened" to the viscosity required by specification D. Eng. Rd. 2,487, i.e. greater than 7.5 cstks. at 210° F.

Higher viscosities invariably result in higher load carrying ability, but it is essential to combine with these higher viscosities, good viscosity-temperature relationships in order that the liquid will be pumpable at temperatures in the region of −40° F. at which temperature the lubricant must show no tendency to crystallise.

We have found that it is possible to increase the viscosity of a diester of a dicarboxylic acid with a saturated monohydric aliphatic alcohol by making a blend of such ester with a polymerised unsymmetrical ester of a dicarboxylic acid with a saturated monohydric aliphatic alcohol and an unsaturated monohydric aliphatic alcohol. We have further found it possible to make such blends having a viscosity greater than 7.5 cstks. at 210° F. having good viscosity-temperature relationship and showing no tendency to crystallise at temperatures down to −40° F.

We have further found that such blends can conveniently be produced by first making a blend of a diester of a dicarboxylic acid with a saturated monohydric aliphatic alcohol, and an unsymmetrical ester of a dicarboxylic acid with a saturated monohydric aliphatic alcohol and an unsaturated monohydric aliphatic alcohol and then polymerising the unsymmetrical ester to give a composition having the viscosity required, for example by heating the blend in presence of a peroxide catalyst. In order that the finished material shall be stable to further heating, it is necessary to remove therefrom all residual peroxide catalyst and either to carry out the polymerisation to substantial completion or to remove any residual unsaturation by chemical combination with a reagent which will add on to the double bonds, e.g. sulphur, halogen or phosphorus. It is most desirable that the iodine number of the final product should not exceed 2.

The expression "unsymmetrical" means that one carboxylic group of the dicarboxylic acid is esterified with one monohydric alcohol and the other carboxylic acid is esterified with a different monohydric alcohol.

The diester of a dicarboxylic acid with a saturated monohydric aliphatic alcohol may be symmetrical or unsymmetrical. It can conveniently be simply termed "saturated diester."

Although it is possible to make the blend of saturated diester and aforesaid unsymmetrical unsaturated diester by forming the two esters separately and mixing them, it has been found more convenient to make the blend directly by esterifying a dicarboxylic acid with more than one but less than two molecular proportions of a saturated monohydric aliphatic alcohol and with less than one molecular proportion of an unsaturated monohydric aliphatic alcohol.

In this way there is formed a symmetrical saturated diester as well as an unsymmetrical unsaturated diester. By employing an amount of saturated monohydric alcohol substantially in excess of the amount of unsaturated monohydric alcohol, little, if any, symmetrical unsaturated ester is formed.

The dicarboxylic acid may be one of the general formula:

(V) 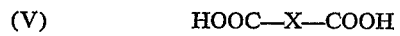 HOOC—X—COOH and the aliphatic alcohols may be of the general formulae:

(VI)  R₁—OH and (VII)  R₂—OH wherein X is an alkylene, cycloalkylene or arylene group, R₁ is the hydrocarbon residue of a saturated monohydric aliphatic alcohol, and R₂ is the hydrocarbon residue of an unsaturated monohydric aliphatic alcohol.

The unsymmetrical unsaturated esters hereinbefore referred to are believed to be new compounds. Accordingly there is provided, according to one feature of the invention, an unsymmetrical ester of a dicarboxylic acid with a saturated monohydric aliphatic alcohol and an unsaturated monohydric aliphatic alcohol.

The invention includes an ester of the general formula:

(I)
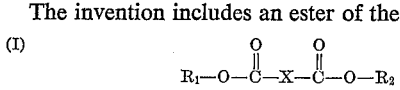
$$R_1-O-\overset{O}{\underset{\|}{C}}-X-\overset{O}{\underset{\|}{C}}-O-R_2$$

wherein X is an alkylene, cycloalkylene or arylene group, R₁ is the hydrocarbon residue of a saturated monohydric aliphatic alcohol, and R₂ is the hydrocarbon residue of an unsaturated monohydric aliphatic alcohol.

The saturated monohydric aliphatic alcohol is preferably one containing at least four, but not more than sixteen carbon atoms. Most suitably it is branched-chain.

The unsaturated monohydric aliphatic alcohol is preferably allyl alcohol.

The dicarboxylic acid is a saturated aliphatic dicarboxylic acid or an aromatic dicarboxylic acid. It may be one of the general formula:

(II)  HOOC—(CH₂)ₓ—COOH wherein $x$ represents an integer from 2 to 18. Examples of suitable dicarboxylic acids are adipic acid, sebacic acid, azelaic acid and phthalic acid.

The unsymmetrical unsaturated ester is conveniently an allyl nonyl sebacate such as allyl 3,5,5-trimethylhexyl sebacate.

The invention includes a polymerisation product of any of the unsymmetrical unsaturated esters defined above. Furthermore, it includes a composition comprising at least one unsymmetrical unsaturated ester as defined above and at least one diester of a dicarboxylic acid with a saturated monohydric aliphatic alcohol; and also a lubricant can be made by polymerising such composition. The said diester of a dicarboxylic acid with a saturated monohydric aliphatic alcohol may be one of those diesters known as lubricants, i.e. one in which the dicarboxylic acid is a saturated aliphatic dicarboxylic acid, such as one of general Formula II, or an aromatic dicarboxylic acid. Thus, it may be, for example, adipic acid, sebacic acid, azelaic acid or phthalic acid.

The invention also includes a composition comprising a polymerisation product as just defined above and a diester of a dicarboxylic acid with saturated monohydric aliphatic alcohol. Such saturated diester may be symmetrical or unsymmetrical.

The invention broadly includes a lubricant comprising at least one substantially saturated polymerisation product of an unsymmetrical unsaturated ester as defined above and at least one diester of a dicarboxylic acid with a saturated monohydric aliphatic alcohol. Such polymerisation product may be of an ester of the general formula:

(III)
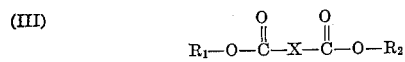

and the ester with saturated monohydric aliphatic alcohol may be one of the general formula:

(IV)
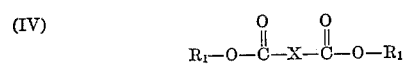

wherein $R_1$, $R_2$ and X have the values given in connection with Formula I above.

Thus, $R_1$ may be an alkyl group containing at least four but not more than sixteen carbon atoms and especially a branched-chain alkyl group.

We have already pointed out that the lubricant blends can conveniently be made by first making a blend of the saturated diester and the unsymmetrical unsaturated diester and then polymerising the unsaturated diester in such mixture. If a symmetrical unsaturated diester is polymerised even in admixture with saturated diester there is a risk of gel formation taking place before the required viscosity has been reached. The formation of gels is prevented if the unsaturation is wholly or mainly present in an unsymmetrical unsaturated diester wherein only one of the alcohol residues is unsaturated as is the case with the unsymmetrical unsaturated esters of the present invention.

Moreover, such a blend can very conveniently be made by the process of the invention as already defined. The employment of substantially more than one molecular proportion of saturated monohydric aliphatic alcohol for each molecular proportion of unsaturated monohydric alcohol ensures that the proportion of symmetrical unsaturated ester, if any, will be small. In general, it is convenient to use one and one half molecular proportions or more of the saturated alcohol for each molecular proportion of the unsaturated alcohol.

In all cases the total of saturated and unsaturated alcohol is not less than two molecular proportions for each molecular proportion of dicarboxylic acid.

The saturated monohydric aliphatic alcohol may be one containing at least four, but not more than sixteen carbon atoms. It is preferably branched-chain and may be an octyl or nonyl alcohol, e.g. 2-ethylhexanol or 3,5,5-trimethylhexanol. The dicarboxylic acid may be, for example, adipic, sebacic, azelaic or phthalic acid.

A lubricant of satisfactory viscosity and viscosity-temperature relationship can be made by polymerising a composition made by the process described above, most suitably by heating it with a peroxide, preferably until the iodine number of the composition is less than 2.

In order to further improve the load carrying properties of a lubricant comprising a polymerisation product as defined above, it is possible to introduce the elements of sulphur, halogen (such as chlorine) or phosphorus into the molecule. These elements can be introduced by reacting residual unsaturated groups with sulphur, sulphur monochloride, halogen, phosphorus sulphides and other compounds containing these elements which are known to react with and add such elements on to double bonds. When it is desired to carry out this type of reaction, the degree of unsaturation present in the lubricant after polymerisation can be greater than that given by an iodine value of 2, and in fact this is preferably the case. When using allyl alcohol and nonyl or octyl alcohols for esterification, the desired degree of unsaturation in the polymerised material is achieved by employing a molecular proportion of the unsaturated monohydric aliphatic alcohol which is more than one-fifth of the molecular proportion of saturated monohydric aliphatic alcohol.

The invention includes broadly a lubricant comprising a dinonyl sebacate and a polymerised allyl nonyl sebacate as well as a lubricant comprising di-3,5,5-trimethylhexyl sebacate and polymerised allyl 3,5,5-trimethylhexyl sebacate.

The lubricants of the present invention may contain such additivies as are known for ester lubricants, for example antioxidants.

Some preferred forms of the invention will now be described by means of examples involving the esterification of sebacic acid with 3,5,5-trimethyl hexanol. The esters are described as "allyl alcohol modified," the percentage modification indicating the molecular percentage of allyl alcohol in the total alcohol used.

*Example 1.—Preparation of 25% allyl alcohol modified 3,5,5-trimethylhexyl sebacate*

| | |
|---|---|
| 3,5,5-trimethylhexanol | 3 mols + 5% excess. |
| Allyl alcohol | 1 mol. + 5% excess. |
| Sebacic acid | 2 mols. |
| Benzene | 400 mls. |
| Conc. sulphuric acid | 4.8 mls. |

The above reactants were refluxed using a Dean and Stark water trap until the reaction was complete. Time of reaction was 12 hours, the water collected was 78 mls. and the final reflux temperature 115° C. The product was then refined as follows:

2 water washes
Neutralised with sodium carbonate solution
1 warm water wash
Steam distilled to remove benzene and excess alcohol
3 water washes
1 neutralisation wash
1 water wash
Dried under vacuum and then percolated through activated alumina.

The yield was in excess of 90% and the material had the following characteristics:

| | |
|---|---|
| Iodine number | 26.8 g. $I_2$/100 g. |
| Viscosity at 210° F | 3.87 cstks. |

*Example 2.—Preparation of 10% allyl alcohol modified 3,5,5-trimethylhexyl sebacate*

| | |
|---|---|
| 3,5,5-trimethylhexanol | 3.6 mols + 5% excess. |
| Allyl alcohol | 0.4 mols + 5% excess. |
| Sebacic acid | 2 mols. |
| Benzene | 400 mls. |
| Conc. sulphuric acid | 4.9 mls. |

The reaction was carried out as in Example 1 with exactly similar subsequent refining.

The yield was in excess of 90% and the product had the following characteristics:

| | |
|---|---|
| Iodine number | 8.66 g. $I_2$/100 g. |
| Acid value | 0.18 mg. KOH/g. |
| Viscosity at 100° F | 17.42 cstks. |

*Example 3.—Polymerisation*

The product of Example 1 was heated at 200° C. under an atmosphere of nitrogen and in the presence of 1% by weight of benzoyl peroxide. After seven hours it had the following characteristics:

| | |
|---|---|
| Viscosity at 100° F | 40.2 cstks. |
| Viscosity at 210° F | 8.06 cstks. |
| Iodine number | 7.2 g./$I_2$/100 g. |

The final seizure load of the Shell 4-Ball Machine 1425 r.p.m., half-inch S.K.F. steel bearings) was 180 kg., compared with 130 kg. for the unpolymerised material.

The flow point was in the order of −55° F. to −60° F. when determined by storing the product for 48 hours at decreasing 10° intervals in a refrigerator.

*Example 4.—Polymerisation*

The product of Example 2 was heated as in Example 3. After 28 hours it had a viscosity of 38.77 cstks. at 100° F.

*Example 5*

15% allyl alcohol modified 3,5,5-trimethylhexyl sebacate was made by the procedure of Example 1 but using 3.4+5% excess mols of 3,5,5-trimethylhexanol and 0.6+5% excess mols of allyl alcohol. The product had the following characteristics:

| | |
|---|---|
| Iodine number | 13.5 g. $I_2$/100 g. |
| Acid value | 1.29 mg. KOH/g. |
| Viscosity at 100° F | 16.47 cstks. |

The product when polymerised as in Example 3 but using 1% by weight of di-tert-butyl peroxide had the following characteristics:

| | |
|---|---|
| Viscosity at 100° F | 30.51 cstks. (4 hours heating). |
| | 39.33 cstks. (8 hours heating). |
| Final iodine number | 1.8 g. $I_2$/100 g. |

A small amount of this polymerised material was heated for a further 12 hours at 200° C., and gave a viscosity at 40.54 cstks. at 100° F. showing that the polymerisation had virtually ceased.

*Example 6*

20% allyl alcohol modified 3,5,5-trimethylhexyl sebacate was made by the procedure of Example 1 but using 3.2+5% excess mols of 3,5,5-trimethylhexanol and 0.8+5% excess mols of allyl alcohol. The product had the following characteristics:

| | |
|---|---|
| Iodine number | 20.2 g. $I_2$/100 g. |
| Acid value | 0.27 mg. KOH/g. |
| Viscosity at 100° F | 15.29 cstks. |

The product, when polymerised as in Example 5 had the following characteristics:
Polymerisation as above.

| | |
|---|---|
| Viscosity at 100° F | 27.88 cstks. (4 hours heating). |
| | 43.94 cstks. (8 hours heating) |
| Final iodine number | 4.4 g. $I_2$/100 g. |

A small amount of the polymerised material was further heated for 12 hours at 200° C. and gave a viscosity of 53.94 cstks. at 100° F.

If 2-ethylhexanol is used instead of 3,5,5-trimethylhexanol in the above examples, similar results are obtained but the polymerisation takes rather a longer time.

As will be seen, the iodine number of the 20% and 25% allyl alcohol modified esters after polymerisation substantially exceeds 2. This indicates that they may be capable of further polymerisation on heating, e.g. when used as lubricants in certain engines. The final product of Example 3 was accordingly heated with 0.5% by weight of sulphur at 200° C. for four hours and then filtered through activated alumina. It then had the following characteristics:

| | |
|---|---|
| Viscosity at 210° F | 8.48 cstks. |
| Viscosity at 100° F | 44.7 cstks. |
| Sulphur content | 0.15%. |
| Flow point | −55° F. |
| Final weld point (Shell 4-Ball Machine) | 300 kg. |

I claim:
1. A process for producing a lubricant composition consisting essentially of esterifying a dicarboxylic acid selected from the group consisting of adipic, sebacic, azelaic and phthalic acids with a mixture consisting essentially of

(a) a major proportion of a saturated monohydric aliphatic alcohol containing from 4 to 16 carbon atoms and (b) a minor proportion of allyl alcohol to form a composition consisting essentially of a symmetrical saturated ester of said dicarboxylic acid and an unsymmetrical unsaturated ester of said dicarboxylic acid, the total amount of said mixture being not less than two molecular proportions for each molecular proportion of said dicarboxylic acid, and polymerizing said unsymmetrical unsaturated ester of said dicarboxylic acid in said composition.

2. The process as defined in claim 1 wherein said dicarboxylic acid is sebacic acid and said saturated alcohol is nonyl alcohol.

3. The process as defined in claim 1 wherein said dicarboxylic acid is sebacic acid and said saturated alcohol is octyl alcohol.

4. The process as defined in claim 2 wherein the molecular proportion of said allyl alcohol is more than one-fifth of the molecular proportion of said saturated monohydric aliphatic alcohol.

5. The process as defined in claim 4 wherein the molecular proportion of said allyl alcohol is more than one-fifth of the molecular proportion of said saturated monohydric aliphatic alcohol.

6. A process for producing a lubricant composition consisting essentially of esterifying a dicarboxylic acid selected from the group consisting of adipic, sebacic, azelaic and phthalic acids with a mixture of (a) more than one but less than two molecular proportions of a saturated monohydric aliphatic alcohol containing from 4 to 16 carbon atoms and (b) with less than one molecular proportion of allyl alcohol to form a composition consisting essentially of a symmetrical saturated ester of said dicarboxylic acid and an unsymmetrical unsaturated ester of said dicarboxylic acid, the total amount of said mixture being not less than two molecular proportions for each molecular proportion of said dicarboxylic acid, and heating said composition in the presence of a peroxide catalyst until said unsymmetrical unsaturated ester of said dicarboxylic acid is polymerized.

7. The process as defined in claim 6 including the step of removing residual peroxide catalyst from said composition.

8. The process as defined in claim 6 including the step of reducing the residual unsaturation of the polymerized unsymmetrical ester in the lubricant composition by reaction with a member selected from the group consisting of sulfur, halogen and phosphorus.

9. The process as defined in claim 6 wherein said heating in the presence of a peroxide catalyst to polymerize said unsymmetrical ester is continued until the iodine number of the composition is less than 2.

10. A process for producing a lubricant composition consisting essentially of esterifying a dicarboxylic acid selected from the group consisting of adipic, sebacic, azelaic and phthalic acids with a mixture of (a) a saturated monohydric aliphatic alcohol containing from 4 to 16 carbon atoms and (b) allyl alcohol, said saturated alcohol being present in the amount of one and one-half molecular proportions for each molecular proportion of allyl alcohol, to form a composition consisting essentially of a saturated symmetrical ester of said dicarboxylic acid and an unsymmetrical unsaturated ester of said dicarboxylic acid, the total amount of said mixture being not less than two molecular proportions for each molecular proportion of said dicarboxylic acid, and heating said composition in the presence of a peroxide catalyst until said unsymmetrical unsaturated ester of said dicarboxylic acid is polymerized.

11. A lubricant composition formed by esterifying a dicarboxylic acid selected from the group consisting of adipic, sebacic, azelaic and phthalic acids with a mixture consisting essentially of (a) a major proportion of a saturated monohydric aliphatic alcohol containing from 4 to 16 carbon atoms and (b) a minor proportion of allyl alcohol to form a composition consisting essentially of a symmetrical saturated ester of said dicarboxylic acid and an unsymmetrical unsaturated ester of said dicarboxylic acid, the total amount of said mixture being not less than two molecular proportions for each molecular proportion of said dicarboxylic acid, and polymerizing said unsymmetrical unsaturated ester of said dicarboxylic acid in said composition.

12. A lubricant composition formed by esterifying a dicarboxylic acid selected from the group consisting of adipic, sebacic, azelaic and phthalic acids with a mixture of (a) more than one but less than two molecular proportions of a saturated monohydric aliphatic alcohol containing from 4 to 16 carbon atoms and (b) with less than one molecular proportion of allyl alcohol to form a composition consisting essentially of a symmetrical saturated ester of said dicarboxylic acid and an unsymmetrical unsaturated ester of said dicarboxylic acid, the total amount of said mixture being not less than two molecular proportions for each molecular proportion of said dicarboxylic acid, and heating said composition in the presence of a peroxide catalyst until said unsymmetrical unsaturated ester is polymerized.

13. A lubricant composition formed by esterifying sebacic acid with a mixture of (a) more than one but less than two molecular proportions of nonyl alcohol and (b) with less than one molecular proportion of allyl alcohol to form a composition consisting essentially of dinonyl sebacate and allyl nonyl sebacate, the total amount of said mixture being not less than two molecular proportions for each molecular proportion of said sebacic acid, and heating said composition in the presence of a peroxide catalyst until said allyl nonyl sebacate is polymerized.

14. A lubricant composition formed by esterifying sebacic acid with a mixture of (a) more than one but less than two molecular proportions of 3,5,5-trimethylhexyl alcohol and (b) with less than one molecular proportion of allyl alcohol to form a composition consisting essentially of di-3,5,5-trimethylhexyl sebacate and allyl 3,5,5-trimethylhexyl sebacate, the total amount of said mixture being not less than two molecular proportions for each molecular proportion of said sebacic acid, and heating said composition in the presence of a peroxide catalyst until said allyl 3,5,5-trimethylhexyl sebacate is polymerized.

15. A lubricant composition formed by esterifying a dicarboxylic acid selected from the group consisting of adipic, sebacic, azelaic and phthalic acids with a mixture of (a) a saturated monohydric aliphatic alcohol containing from 4 to 16 carbon atoms and (b) allyl alcohol, said saturated alcohol being present in the amount of one and one-half molecular proportions for each molecular proportion of allyl alcohol, to form a composition consisting essentially of a symmetrical saturated ester of said dicarboxylic acid and an unsymmetrical unsaturated ester of said dicarboxylic acid, the total amount of said mixture being not less than two molecular proportions for each molecular proportion of said dicarboxylic acid, and heating said composition in the presence of a peroxide catalyst until said unsymmetical unsaturated ester of said dicarboxylic acid is polymerized.

References Cited in the file of this patent

UNITED STATES PATENTS

| | | |
|---|---|---|
| 2,062,917 | Lawson | Dec. 1, 1936 |
| 2,296,823 | Pollack et al. | Sept. 22, 1942 |
| 2,375,516 | Blair | May 8, 1945 |
| 2,384,595 | Blair | Sept. 11, 1945 |
| 2,422,881 | Blair | June 24, 1947 |
| 2,441,023 | Larsen et al. | May 4, 1948 |
| 2,603,560 | Stewart | July 15, 1952 |
| 2,756,219 | Van Der Plas et al. | July 24, 1956 |

OTHER REFERENCES

"I. and E. Chem.," vol. 39, No. 4, April 1947, pages 494 and 495.

"Synthetic Lubricants," W. E. McTurk, Wright Air Development Center, Technical Report 53–88, Oct. 1953, pages 18 and 19.